P. McManus,
Wrench.
No. 14,571.    Patented Apr. 1, 1856.
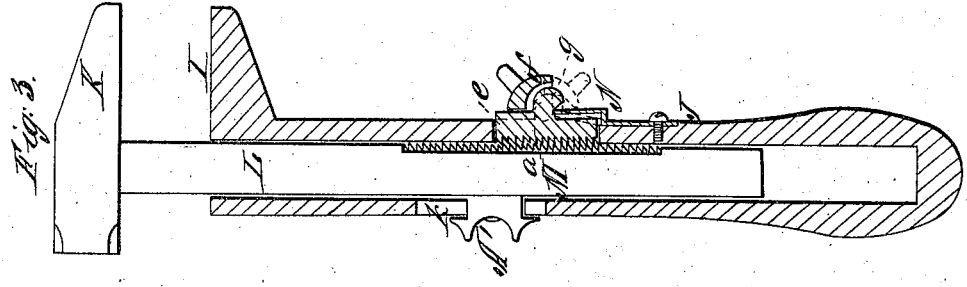
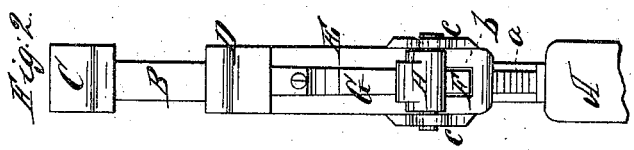
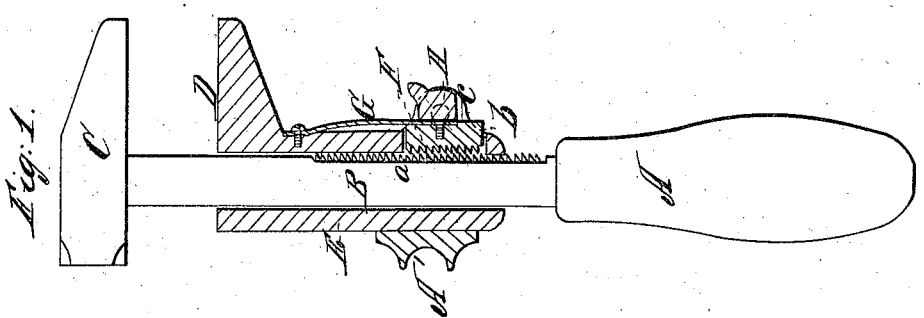

UNITED STATES PATENT OFFICE.

PHILIP McMANUS, OF BRUNSWICK, NEW YORK.

WRENCH.

Specification of Letters Patent No. 14,571, dated April 1, 1856.

*To all whom it may concern:*

Be it known that I, PHILIP MCMANUS, of the town of Brunswick, in the county Rensselaer and State of New York, have invented a new and useful Improvement in Wrenches; and I do hereby declare that the following is a full, clear, and exact description of the same, reference being had to the annexed drawings, making a part of this specification, in which—

Figure 1, is a side view of my improvement, the lower and movable jaw being bisected vertically through its center. Fig. 2, is an edge view of ditto. Fig. 3 is a side view of a modification of Figs. 1, and 2, the lower jaw being stationary and bisected vertically through its center.

The nature of my invention consists in securing the movable or sliding jaw at any desired point by means of two racks, one of which is attached to the shank of the stationary jaw or to the permanent part of the wrench, and the other to the sleeve of the sliding jaw or to the movable part of the wrench, one of the racks being thrown in and out of gear with the other by means of a spring and cam or eccentric, as will be presently shown and described.

To enable those skilled in the art to fully understand and construct my invention, I will proceed to describe it.

A, Figs. 1, and 2, represents the handle of a wrench, and B, represents the shank of a stationary jaw C, the shank being firmly secured in the handle A, and having a rack (*a*) cut in one side of it.

D, represents a sliding jaw which is attached to a sleeve E, the jaw and sleeve being fitted on the shank B, and allowed to slide freely thereon. In one side of the sleeve E, there is made a slot or opening (*b*) in which a rack F is fitted, see Fig. 2, the back of said rack being secured to a spring G, which is attached to the outer side of the sleeve. The sleeve E, has two ears or projections (*c*) (*c*) attached to it at opposite sides between which ears or projections a cam or eccentric H, is fitted.

The spring G, has a tendency to keep the rack F, out or free from the rack (*a*) and the sleeve E, with its jaw D, may be moved up and down upon the shank B. But by turning the cam or eccentric H, the spring G, and rack F, will be forced inward, the rack F, catching into the rack (*a*) and thereby securing the jaw D. By the above improvement it will be seen that the jaw D, may be readily moved and secured at any desired point so as to suit different sized nuts.

Fig. 3, shows merely a modification of the wrench above described and represented by Figs. 1, and 2. In Fig. 3, the lower jaw I, is stationary and is attached to the handle J, the upper jaw K, having a shank L, attached to it which shank slides or works within the handle J. The shank L, has a rack (*d*) on one side of it, and the handle J, has an opening or slot (*e*), made in it to receive a rack M, which is attached to a spring N, precisely the same as shown in Figs. 1, and 2. The spring N, and rack M, are pressed inward by means of an eccentric (*f*) which works over a convex projection (*g*) on the back of the rack M.

This invention is extremely simple, economical to construct, and is not liable to get out of repair.

On one side of the sleeve F, opposite to the cam or eccentric H, see Fig. 1, there is attached a finger piece A′, to receive the fore finger and thereby enable the operator to adjust the movable jaw D, with one hand only, the eccentric or cam H, being operated by the thumb. This is important in many cases, as the operator is often compelled to support himself with one hand, and operate the wrench with the other. In Fig. 3, the thumb piece is attached to the shank D, of the movable or upper jaw, and a slot *h*, is made through the stationary part of the wrench in order to allow the thumb piece and shank to move up and down.

I do not claim separately a cam or eccentric for holding or securing the sliding jaw at desired points; but What I do claim as new and desire to secure by Letters Patent, is—

1. The cam or eccentric, H, attached to the sleeve, E, and the rack, F, attached to the sleeve by a spring, G, in combination with the rack (*a*) on the shank, B, the above parts being arranged substantially as shown and described for the purpose specified.

2. I further claim in combination with the cam or eccentric H, and racks, F, (*a*), the finger-piece, A′, as described.

PHILIP McMANUS.

Witnesses:
CHARLES W. ROOT,
JULIUS HUTH.